United States Patent [19]

English

[11] Patent Number: 4,611,981

[45] Date of Patent: Sep. 16, 1986

[54] THREE-MOLD HAND-OVER-HAND BLOW MOLDING MACHINE

[76] Inventor: Larry W. English, Rte. 52 Box 386, Terre Haute, Ind. 47805

[21] Appl. No.: 769,901

[22] Filed: Aug. 27, 1985

Related U.S. Application Data

[62] Division of Ser. No. 518,724, Jul. 29, 1983, abandoned.

[51] Int. Cl.⁴ .......................................... B29C 17/07
[52] U.S. Cl. .................................. 425/529; 425/526; 425/527; 425/538; 425/539; 425/541; 425/162; 264/532
[58] Field of Search ............... 425/522, 526, 527, 528, 425/529, 530, 535, 538, 539, 541, 162; 264/532, 521

[56] References Cited

U.S. PATENT DOCUMENTS

| | | |
|---|---|---|
| 2,790,994 | 5/1957 | Cardot et al. ................ 425/532 X |
| 2,890,485 | 6/1959 | Knowles ...................... 425/535 X |
| 3,496,258 | 2/1970 | Wiley ............................ 264/521 |
| 3,541,189 | 11/1970 | Yoshikawa et al. ........... 425/526 X |
| 3,651,186 | 3/1972 | Hall ............................. 425/529 X |
| 3,699,199 | 10/1972 | MacDuff ..................... 425/526 X |
| 3,751,542 | 8/1973 | Hall ............................. 425/526 X |
| 3,771,931 | 11/1973 | Fischer et al. ............... 425/526 X |
| 3,798,295 | 3/1974 | MacDuff ..................... 425/529 X |
| 3,834,852 | 9/1974 | Hall ............................. 425/538 |
| 4,432,720 | 2/1984 | Wiatt et al. .................. 425/535 X |
| 4,477,408 | 10/1984 | Michl et al. ................. 425/538 X |
| 4,484,882 | 11/1984 | English ....................... 425/538 X |

FOREIGN PATENT DOCUMENTS 1379536  1/1975  United Kingdom .............. 264/532

Primary Examiner—J. Howard Flint, Jr.

[57] ABSTRACT

Disclosed is an improved hand-over-hand blow molding machine and the method for forming a chain of hollow, shaped article bodies of biaxially oriented, normally highly crystalline thermoplastic material from a tube of said material in substantially unoriented condition, but at an orientation temperature. The machine and method are characterized by an additional blow mold in tandem with one of the blow molds of the prior art two mold machine and method. The machine is operated so that each longitudinally stretched portion of the tube on which the mold pieces of each blow mold closes has substantially the same extent of longitudinal stretch or elongation. This is done by arresting the travel of the tube into the machine according to the distance of travel of the blow mold pulling it into the machine.

1 Claim, 9 Drawing Figures

THREE-MOLD HAND-OVER-HAND BLOW MOLDING MACHINE

This application is a division of application Ser. No. 518,724, filed July 29, 1983, now abandoned.

BACKGROUND OF THE INVENTION

1. Field of the Invention

This invention relates to the art of blow molding of thermoplastic materials. More particularly, it relates to ways and means for blow molding hollow shaped articles from a normally highly crystalline thermoplastic material such as polypropylene and the like, that must be biaxially oriented to achieve certain desirable properties such as high strength, clarity, and the like.

2. Description of the Prior Art

The manufacture of shaped hollow articles, for example, containers such as bottles and the like, from said thermoplastic material has been accomplished by blow molding methods. Two such general methods start with a continuous tube that has been extruded from the thermoplastic material, cooled to crystallize the material, and then subjected to heat treatment. Examples of such heat treatment are disclosed in the U.S. Pat. Nos. Re 26,956 and 3,496,258, to Wiley, and the U.S. Pat. No. 3,677,530, to MacDuff.

In one method a piece of the tube, the material of which generally is at its orientation temperature, is cut and the cut piece, referred to as a prison, is grabbed at each end and longitudinally stretched. While the parison is in the stretched condition, the mold pieces of a blow mold are closed upon the tube, and the tube is expanded, generally by blowing air into the parison, to form the body of the desired article. The mold pieces are then opened, the formed body is removed, and the cycle is repeated. This method has a number of disadvantages, one of which is that its production rate is inherently low.

In the second general blow molding method, the tube is basically left intact. In one embodiment of this general method a "hand-over-hand" longitudinally stretching and blow molding technique is used to make a chain of hollow bodies of the desired shaped article. This is shown in the U.S. Pat. Nos. 3,699,199, 3,704,188 and 3,798,295, to MacDuff, and the U.S. Pat. Nos. 3,751,542 and 3,834,852, to Hall. In this embodiment two movable blow molds are involved. The mold pieces of the first blow mold at a first position are closed on the tube, and the blow mold is then moved away a predetermined distance to a second position. During this movement of the mold the portion of the tube within the blow mold is blown into the shape of the mold cavity, and the portion of the tube trailing the blow mold is pulled by the blow mold from a first point to a second point. Throughout the pull of the tube or at a preselected time during the pulling of the tube, its travel past the first point is restricted as by a restrictor cone or by a clamp so that the portion thereof between the two points becomes longitudinally stretched by the time the first mold reaches the second position. In the meantime, the second blow mold with its mold pieces open and straddling the first blow mold with its mold pieces closed is returned from the second position to the first position, and the mold pieces are closed on said stretched portion of the tube. The mold pieces of the first blow mold are opened. The second closed blow mold then is moved to the second position to push away the blow molded body from between the opened pieces of the first blow mold, and at the same time pull the trailing portion of the tube from the first point to the second point. Throughout the pull of the tube by the second blow mold or at a preselected time during the pull, the movement of the tube past the first point is restricted, and the portion of the tube between the two points becomes longitudinally stretched by the time the second blow mold has reached the second position. As in the case of the first blow mold, during this forward movement of the second blow mold the stretched portion of the tube within the mold is blown to expand the tube into conformance with the configuration of the mold cavity, whereby the body is formed and the material becomes biaxially oriented. The blow molded body pushed from between the opened pieces of the first blow mold is linked by an unexpanded portion of the tube to a previously formed chain of linked together blow molded bodies. This chain is conveyed from the machine to a finishing operation in which the bodies are separated from the links and trimmed, and the article mouths or necks or other openings are bored or cut to give the finished articles.

The production rate of the "hand-over-hand" machine and method is limited to a large extent by the number of molds in the machine. To increase the production rate, therefore, more molds should be added. In constructing new machines this can be done readily, if there are no space limitations or monetary constraints. In such instance the first blow mold becomes two blow molds which are moved and for the most part operated together, the second blow mold becomes two blow molds which likewise are moved and for the most part operated together, whereby there is symmetry in structure and operation, and the machine is lengthened so that the extent of longitudinal stretch of the tube is substantially the same each time it is stretched.

Where, however, an existing machine or a new machine with space limitations or monetary constraints is involved, the addition of two molds might not be feasible, whereas the addition of one blow mold might be. Hence, a problem to which this invention provides a solution is how to incorporate one additional blow mold into a "hand-over-hand" two-mold machine and method, and yet have the longitudinal stretch of each length of the tube on which the mold pieces of each blow mold close substantially the same.

The machine and method described herein are sufficient improvements of the "hand-over-hand" machine and method.

SUMMARY OF THE INVENTION

The improved "hand-over-hand" blow molding machine of this invention is adapted to receive at its front end the continuous tube of substantially biaxially unoriented, normally highly crystalline thermoplastic material at its orientation temperature, form along a longitudinal axis with three blow molds the tube into a continuous chain of hollow, shaped article bodies of the material in the biaxially oriented condition, and discharge at its back end the chain of bodies.

The machine has a normal cycle of operation in the first phase of which the tube is pulled from a first or front point in the region of the front end of the machine to a second or back point on the axis, and in the second phase of said operation is pulled from said front point to an intermediate point on said axis between said front and back points.

The machine comprises a stationary tube clamp, a first blow mold assembly, first prime mover means for the first blow mold assembly, a second blow mold assembly and a third blow mold assembly, and second prime mover means for the second and third blow mold assemblies.

The stationary tube clamp functions to arrest or stop the travel of the tube past the front point during at least part of the time it is being pulled in each of the two phases of said cycle of operation. In this way in the first phase the portion of the tube between the front and back points becomes longitudinally stretched, and in the second phase the portion of the tube between the front and intermediate points becomes longitudinally stretched.

The first blow mold assembly comprises a first blow mold having a front end and a back end, and movable along a path parallel to the axis to and from a front position whereat its front end is in the region of the front point, and a back position whereat its front end is substantially at said back point, and the back end is at a rearward limit of travel. The mold comprises at least two mold pieces closable on the stretched part of the tube between the front and intermediate points, and means for opening and closing the mold pieces. After formation of a hollow body in the cavity defined by the closed mold pieces, they are openable to positions whereat they are out of the path of travel of the closed mold pieces of the blow molds of the second and third blow mold assemblies. In addition, the first blow mold comprises tube inflation means for inflating the portion of the stretched part of the tube within the mold cavity to form one of the bodies herein and biaxially orient the material thereof.

The first prime mover means function to move the first blow mold assembly back and forth and thus the first blow mold from and to said front position and said back position. These means can comprise the threaded bushing-threaded shaft-reversible motor combination of the prior art, such as shown in the U.S. Pat. No. 3,699,199, to MacDuff. Other means such as a hydraulic fluid actuated cylinder piston and piston rod combination also are within the scope of this invention.

The second and third blow mold assemblies are disposed oppositely to the first blow mold assembly. They have substantially the same structure as the first blow mold assembly. Together they comprise two adjacent blow molds. The two blow molds are longitudinally aligned and movable together in tandem along the longitudinal axis from and to their front positions whereat the front end of the second mold is substantially at said front point, and their back positions whereat the front end of the second mold is substantially at said intermediate point, and the back end of the third mold is substantially at said rearward limit of mold travel. Each of these molds has at least two mold pieces closable on the stretched part of the tube between said front and back points and, after formation of a hollow body in each cavity defined by the closed mold pieces, openable to positions whereat they are out of the path of travel of the closed mold pieces of the first blow mold. Each mold comprises tube inflation means for inflating the portion of the stretched part of the tube within the mold cavity, whereby one of said bodies is formed in each mold cavity, and the material thereof becomes biaxially oriented. Also, included are mold opening and closing means for opening and closing the mold pieces of the second and third blow molds.

The second prime mover means likewise function to move the second and third blow mold assemblies in tandem back and forth, and thus said second and third blow molds from and to their front positions and their back positions. The second prime mover means and the first prime mover means preferably are the same kind and have the same or similar construction.

The blow molding machine of this invention is operated in the following manner. In this method the mold opening and closing means of the first blow mold assembly are made to close the mold pieces of the first blow mold on the part of the tube between the front and intermediate points, when the first blow mold is in its front position, and to maintain the mold pieces closed on that part of the tube while the first blow mold is being moved from its front position to its back position, to open the mold pieces when the blow mold is in its back position, and to keep the mold pieces open while the first blow mold is moved from its back position to its front position.

The mold opening and closing means of the second and third blow mold assemblies are caused to close the mold pieces of the second and third blow molds on the part of the tube between the front and back points when the second and third blow molds are in their front positions, to maintain the mold pieces closed on that part of the tube while said blow molds are moved from their front positions to their back positions, to open the mold pieces when the blow molds are in their back positions, and to keep the mold pieces open while the blow molds are moved from their back positions to their front positions.

The first prime mover means are caused to move the first blow mold from its front position to its back position while the second prime mover means are made to move the second and third blow molds from their back positions to their front positions, and to move the first blow mold from its back position to its front position while the second prime mover means are made to move the second and third blow molds from their front positions to their back positions.

Closing of the mold pieces of the first, second, and third blow molds in their front positions on the tube followed by the movement of the blow molds to their back position causes the tube to be drawn or pulled along the longitudinal axis of the machine, and the chain of hollow, shaped article bodies formed in the molds and released therefrom upon opening of the mold pieces to be pushed from the machine. According to the basic concepts of this invention, all of these actions are coordinated so that the distance of travel of the first blow mold from its front position to its back position, the distance of travel of the second and third blow molds from their front positions to their back positions, and the stoppage of travel of the tube past said first point by the stationary tube clamp means result in the extent of longitudinal stretch of the portion of the tube on which the mold pieces of the first blow mold close to be substantially the same as the longitudinal stretch of the portions of the tube on which the mold pieces of the second and the third blow molds close.

The tube inflation means of each blow mold are caused to inflate the portion of the stretched part of the tube within the mold cavity or cavities after the mold pieces have closed thereon, and preferably while the blow mold or molds is or are being moved from their front positions to their second positions.

There is a tendency upon simultaneous opening of the mold pieces of the second and third blow molds for the chain to snap back. This is due primarily to elastic recovery and to a minor degree to temperature shrinkage of the thermoplastic material in the chain. To minimize this effect, in preferred embodiments of the invention the mold pieces of the second and third blow molds are opened sequentially. Preferably they are opened sequentially beginning with the third blow mold and followed by the second blow mold.

BRIEF DESCRIPTION OF THE DRAWINGS

The best mode now contemplated of carrying out the invention is illustrated by a preferred embodiment of the three mold "hand-over-hand" blow molding machine of this invention, which is shown in the drawings which form a material part of these disclosures. In the drawings.

DETAILED DESCRIPTION OF THE DRAWINGS

STRUCTURE

Figure 1:
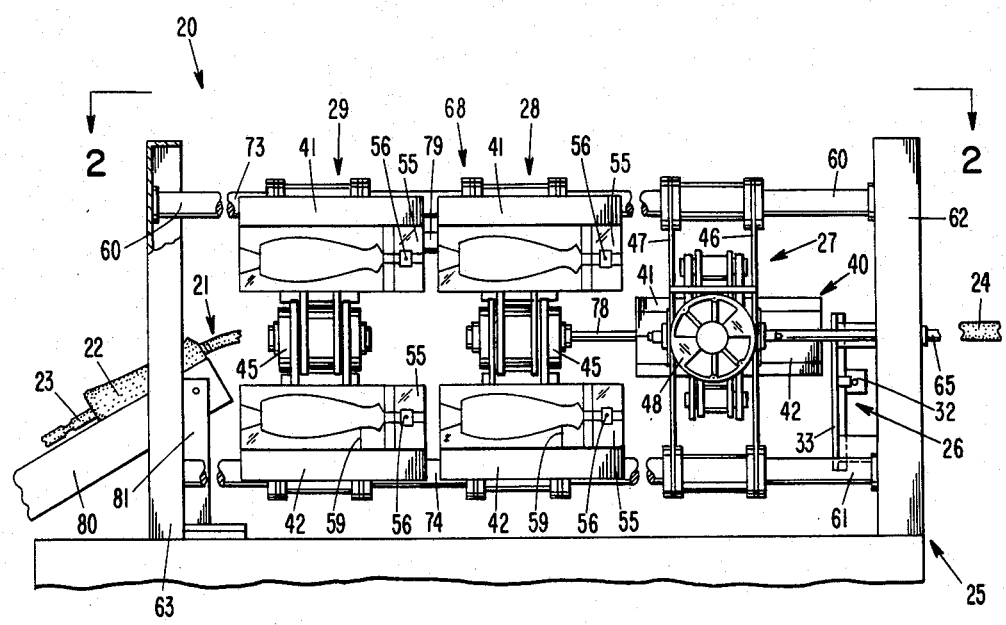
FIG. 1 is a side view of the preferred embodiment with the first blow mold in its front position, and the second and third blow molds in their back positions, in which view part of the support structure, a previously formed portion of the blow molded body chain 21 within the blow molding zone of the machine, and all of the hoses, wiring, cables, switches, and the like have been partially removed or omitted to reveal inner structures and to simplify the view.
Figure 2:
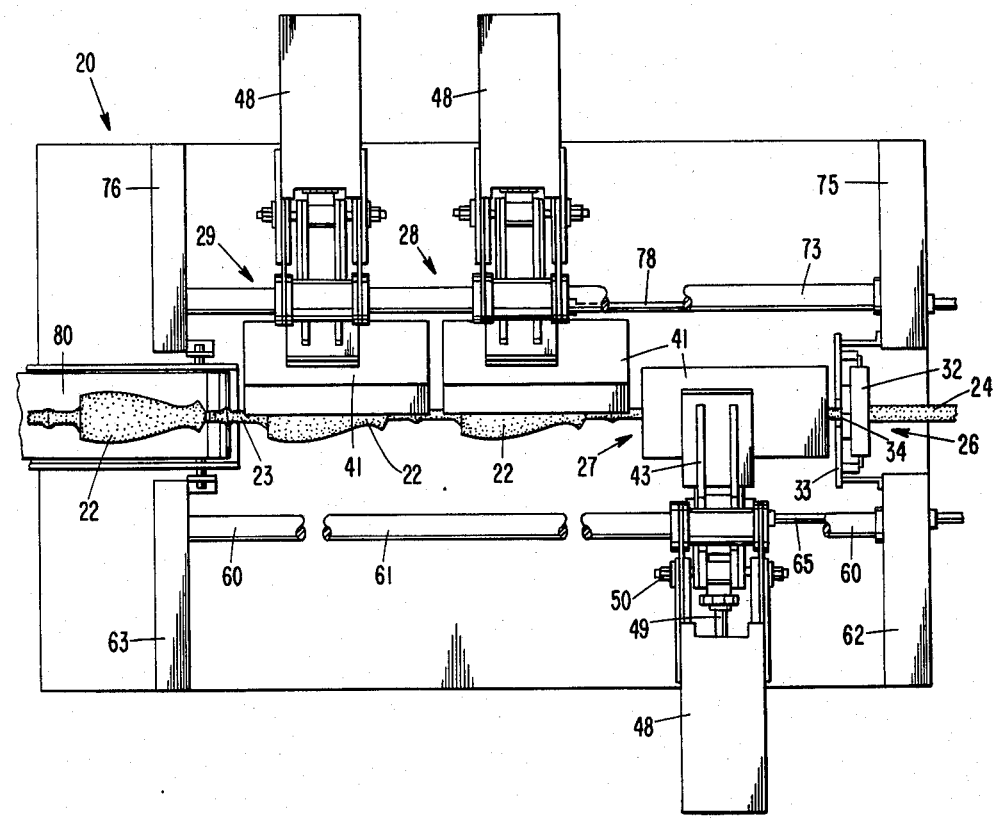
FIG. 2 is a plan view of the machine shown in FIG. 1.

More specifically, FIGS. 1-6 of the drawings illustrate a three mold "hand-over-hand" type blow molding machine 20 for making a chain 21 of threaded top bottle bodies 22 connected by links 23, which bodies are composed of a biaxially oriented, normally highly crystalline thermoplastic material, from a continuous tube 24 of said material which is substantially biaxially unoriented, but at a temperature at which it can be oriented.

The machine 20 comprises a support structure 25 on which is mounted a stationary tube clamp assembly 26, a first blow mold assembly 27, a second blow mold assembly 28, and a third blow mold assembly 29.

Figure 7:
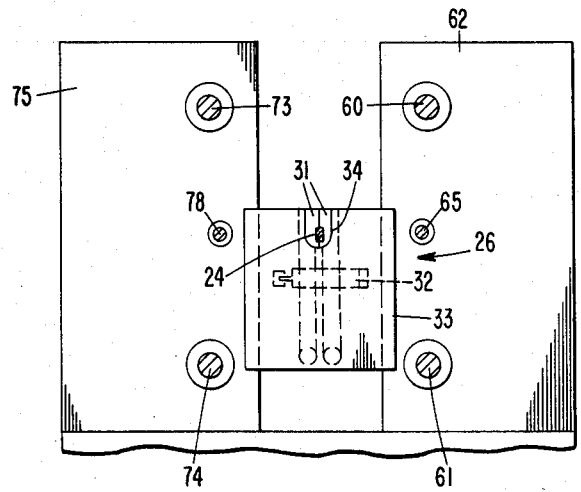
FIG. 7 is a view of the stationary tube clamp assembly which view has been taken as indicated by the view plane 7—7 in FIG. 3.

The stationary tube clamp assembly 26 (FIGS. 2 and 7) is in the front part of the machine. In this embodiment it comprises a pair of clamp jaws 31, a prime mover 32 for these jaws and a support plate 33. The jaws at one end are pivotly mounted on the support plate 33 (which is in a plane perpendicular to the longitudinal axis of the machine) on axes parallel to said longitudinal axis and positioned to close on and grip the tube 24 when it is substantially on the longitudinal axis of the machine. The clamp jaws are opened and closed by means of the prime mover 32 which in this embodiment is an air cylinder and piston rod combination connected at each end to the clamp jaws. The support plate 33, which has a notch 34 to accommodate travel of the tube 24 past the support plate when the clamp jaws are open, is secured to the support structure 25 of the machine.

Figure 8:
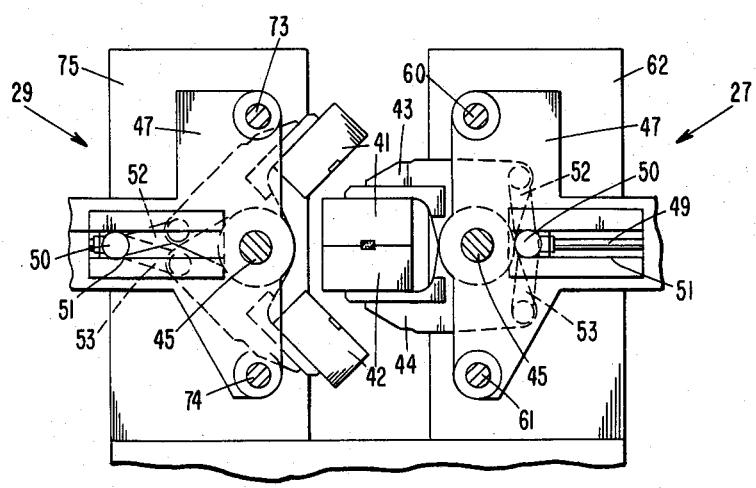
FIG. 8 is a cross section of the machine, which view has been taken as indicated by the sectioning plane 8—8 of FIG. 3.
Figure 4:
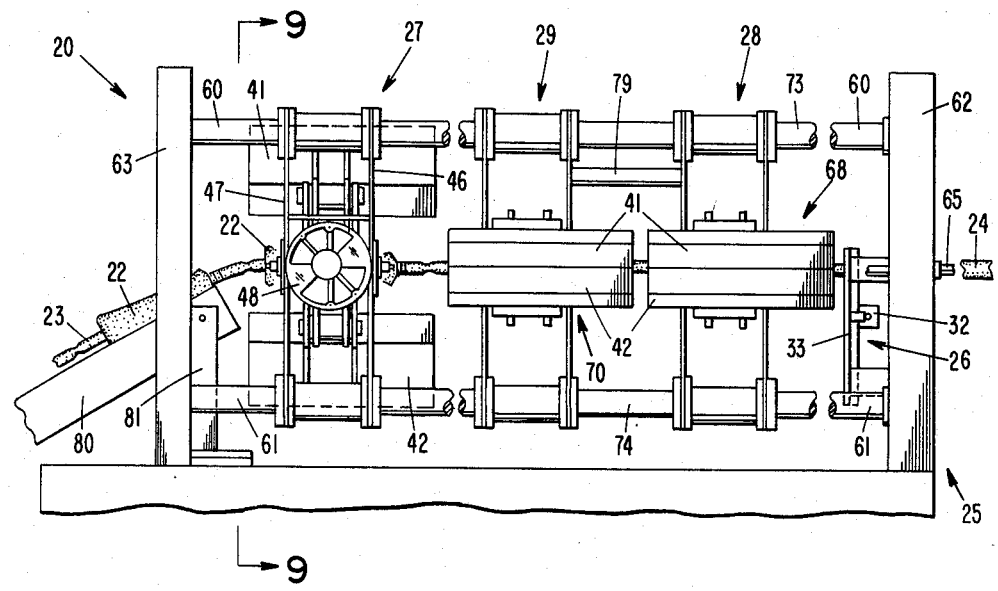
FIG. 4 is a similar side view of the machine with the first blow mold in its back position, but with the mold pieces open, and the second and third blow molds in their first positions with the mold pieces thereof closed on the longitudinally stretched portion of the tube 24.
Figure 9:
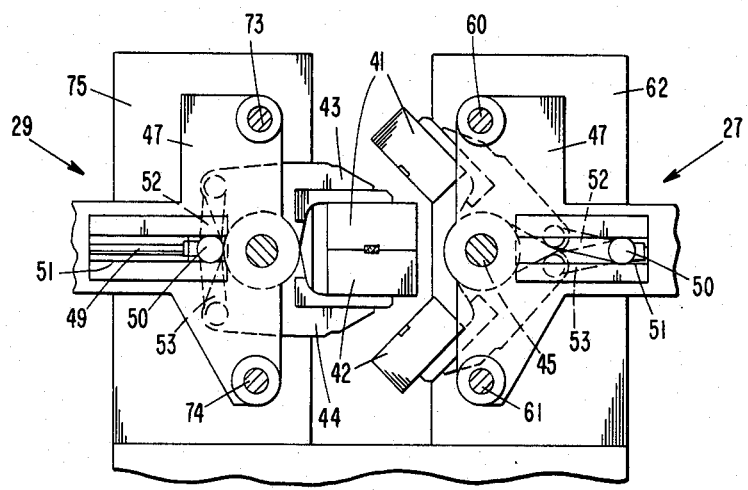
FIG. 9 is a cross-section of the machine taken as indicated by the sectioning plane 9—9 of FIG. 4.
Figure 5:
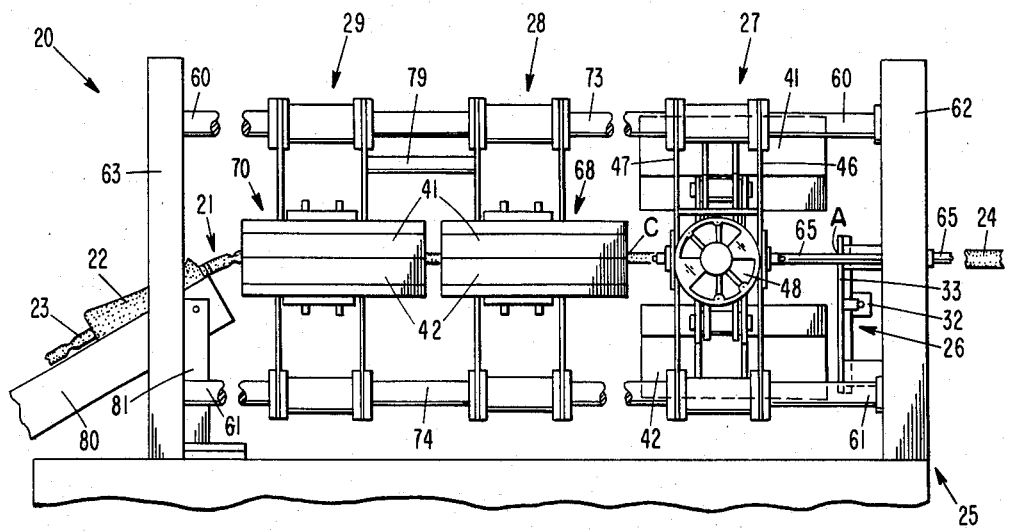
FIG. 5 is a similar side view of the machine with the first blow mold in its front position, but with the mold pieces thereof open, and the second and third blow molds in their back positions with the mold pieces thereof closed.
Figure 6:
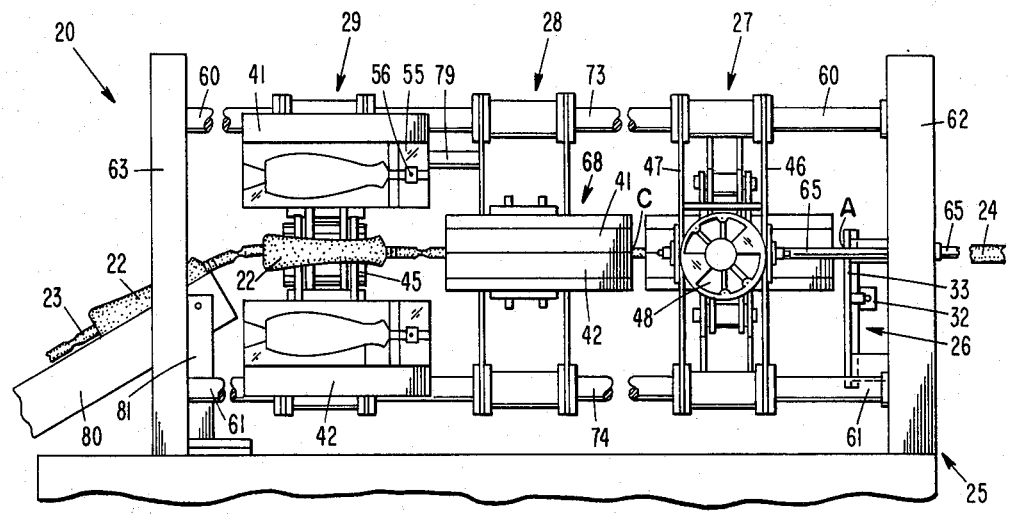
FIG. 6 is another similar side view of the machine, but showing the first blow mold in its front position with the mold pieces open, and the second and third blow molds in their back positions with the mold pieces of the second blow mold still closed, but with the mold pieces of the third blow mold open.

The first blow mold assembly 27 comprises a blow mold 40 (FIGS. 3 and 8) which in the embodiment shown is formed by an upper mold piece 41 and a lower mold piece 42. The upper mold piece 41 is secured to a bracket 43. The lower mold piece is secured to a lower bracket 44. Both brackets are rockably mounted on a shaft 45, the axis of which is parallel to the longitudinal axis of the machine. The shaft 45 is secured at its ends to longitudinally spaced front and back support plates 46 and 47. Also mounted on the support plates is an air cylinder 48 with a piston attached to a piston rod 49 the outer end of which is connected to a spindle 50 that is parallel to the shaft 45. The ends of the spindle are slideably seated in horizontal, parallel races 51 in the support plates 45 and 46. The upper bracket 43 and the lower bracket 44 are pivotally connected to links 52 and 53 which are pivotally mounted on the spindle 50, whereby, when the air cylinder piston rod 49 is fully retracted (FIG. 9), the upper and lower mold pieces 41 and 42 are open, and when the air cylinder piston rod 49 is fully extended (FIG. 8), the upper and lower mold pieces are in closed position.

In closed position the mold pieces 41 and 42 provide a cavity conforming to the exterior shape of the bottle body 22 the longitudinal axis of which coincides substantially with the longitudinal axis of the machine. In addition the faces of the mold pieces are configured so that when closed on the tube 24 the ends of the part of the tube inside the closed mold pieces are pinched into permanent air tight seals. Because in the embodiment shown the desired article is a bottle having a neck with a laterally projecting screw thread for a bottle cap or the like, the blow mold 40 is equipped with a thread forming and neck cramming assembly 55 (only part of which is diagramatically shown in FIG. 1), such as disclosed in the U.S. Pat. No. 3,834,852, to Hall. Each mold piece is provided with a tube pierceable, extendable and retractable, air blow pin 56 for blowing air into the part of the tube within the cavity of the blow mold 40. Also, the mold pieces are provided with a vent 59 to permit the escape of air between that part of the tube and the mold cavity wall while the tube is being transversedly expanded by the flow of air through the air blow pins 56. In addition, the mold pieces 41 and 42 have internal passages for the circulation of coolant. These passages are coupled through end couplings to coolant hoses (not shown).

The front and back support plates 46 and 47 of the first blow mold assembly 26 are secured to sleeves slideably mounted (FIGS. 1-3) on parallel upper and lower slide bars 60 and 61 which are disposed parallel to the longitudinal axis of the machine and secured to front and back end plates 62 and 63 which form part of the support structure 25 of the machine.

In combination with the first blow mold assembly 27 is a first prime mover, only part of which is shown in the drawings. The first prime mover comprises a longitudinal piston rod 65 (FIGS. 1 and 2) of an air or other hydraulic fluid activated piston-cylinder assembly, the cylinder of which is stationarily mounted in front of the machine. The prime mover piston rod 65 is connected at its outer end to the front support plate 46 of the first blow mold assembly 27. The first prime mover functions to move the first blow mold assembly 27 from its front position (FIGS. 1 and 2) with the front end of the blow mold 40 in the region of the clamp jaws 31 to its back position (FIG. 3) with the back end of the first blow mold 40 at substantially the back limit of mold travel in the machine.

The second blow mold assembly 28 and third blow mold assembly 29 (FIGS. 1, 2 and 4) have essentially the same construction as the first blow mold assembly 27, and the second blow mold 68 and third blow mold 70 have substantially the same dimensions and cavities as the first blow mold 40. However, the two assemblies are positioned oppositely to the blow mold assembly 27. Moreover, in the embodiment shown the blow molds 68 and 70 of the second and third blow mold assemblies are arranged with the back end of the second blow mold 68 facing the front end of the third blow mold 70, but spaced therefrom, and positioned such that when closed the longitudinal axis of the machine and the longitudinal axis of each cavity of the blow molds are substantially coincident. Also, the second and third blow mold assemblies are connected together by means of a tie bar 79 (FIGS. 4-6) connected to the back support plate of the second blow mold assembly 28 and the front support plate of the third blow mold assembly 29. The front and back support plates of each of the second and third blow mold assemblies 28 and 29 (FIGS. 1 and 4) are secured to sleeves slideably mounted on upper and lower slide bars 73 and 74 attached to a front end plate 75 and a back end plate 76 of the support structure 25.

The second and third blow mold assemblies 28 and 29 are in combination with a second prime mover, only part of which is shown. In the embodiment illustrated the second prime mover comprises a longitudinal piston rod 78 (FIGS. 1 and 2) of an air or other hydraulic fluid actuated piston-cylinder assembly, the cylinder of which is stationarily mounted in front of the machine. The outer end of the piston rod 78 is secured to the second blow mold assembly 28. The second prime mover functions to push the second and third blow mold assemblies 28 and 29 in tandem from their front positions (FIG. 4) whereat the front end of the second blow mold 68 is in the region of the clamp jaws 31 to their back positions (FIG. 5) whereat the back end of the third blow mold 70 is substantially at the back limit of mold travel in the machine.

The blow molding machine 20 shown in the drawings is intended to be used with a continuous belt discharge conveyor 80 (FIG. 1) for the chain 21 of bottle bodies 22. The front or chain receiving end of the conveyor 80 is mounted on a bracket 81 on the machine support structure 25 in the region of the back limit of travel of the back end of the blow mold 40 of the first blow mold assembly 27 and of the back end of the blow mold 70 of the third blow mold assembly 29.

Although the machine 20 can be operated by hand, this is not very practical. Hence, in preferred embodiments mechanical or electrical control means are provided to operate the machine. These are believed to be within the skill of the art and, therefore, are not described herein.

Operation

The machine 20 is a continuously acting machine having a cycle of operation in which at the beginning of the first phase of the cycle (FIGS. 1 and 2) the first blow mold assembly 27 is in its front position with the upper and lower mold pieces 41 and 42 of the blow mold 40 thereof closed on the previously stretched portion of tube 24 of thermoplastic material at an orientation temperature, while the second and third blow mold assemblies 28 and 29 are in their back positions with the upper and lower mold pieces thereof in open position. The clamp jaws 31 are open. The conveyor 80 is started and the first blow mold assembly 27 is pushed by the piston rod 65 of the first prime mover to the back position (FIG. 3) of the first blow mold assembly. In the meantime the second and third blow mold assemblies with their mold pieces open and straddling (FIG. 8) the closed mold pieces 41 and 42 of the first blow mold assembly are together pulled back to their front positions by the piston rod 76 of the second prime mover means. The first blow mold 40 in its travel from its front position to its back position pulls the tube 24 from a first or front position A (FIGS. 2 and 3) at the clamp jaws 31 to a second or back position B on the longitudinal axis of the machine and pushes from the machine onto the conveyor 80 the previously formed part of the chain 21 of bottle bodies (which part comprises two bottle bodies). As the first blow mold assembly 27 is being pushed from its front position to its back position, when it has reached a proportion of its travel from its front position to its back position, which proportion is dependent on the thermoplastic material and the longitudinal stretch needed to axially orient it, about one-third of its distance of travel between the two positions in the case of polypropylene, the clamp jaws 31 of the stationary tube clamp are closed on the tube 24 and grip it tightly. This arrests movement of the tube into the machine, and causes that portion of the tube between the front of the blow mold 40 of the first blow mold assembly to longitudinally stretch to the desired extent by the time the first blow mold assembly 27 reaches its back position. After the upper and lower mold pieces 41 and 42 of the first blow mold 40 in its front position have closed on the longitudinally stretched position of the tube, the air blow pins 56 thereof are inserted into that part of the tube in the cavity of the blow mold 40, high pressure air is introduced through the pins to inflate that part of the tube into substantial configuration with the blow mold cavity and biaxially orient the material thereof, and the thread forming and neck cramming assembly 55 is actuated.

Figure 3:
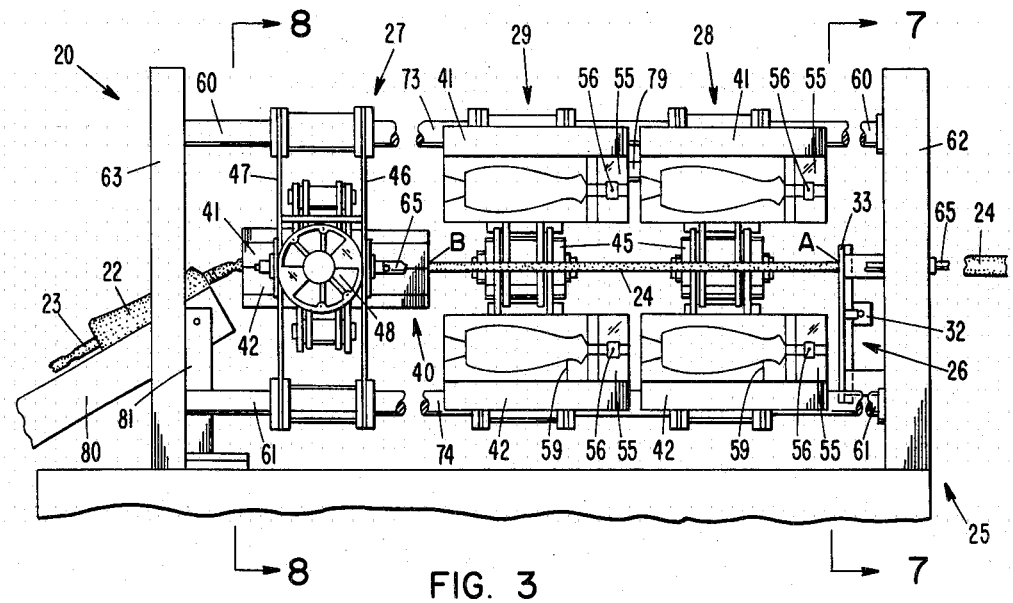
FIG. 3 is a similar (with respect to omitted and partially removed parts, etc.) side view of the machine, but showing the first blow mold in its back position, and the second and third blow molds in their first positions prior to closing on the longitudinally stretched portion of the tube 24.

When the first blow mold assembly reaches its back position, the discharge conveyor 80 is stopped. At about the same time the second and third blow mold assemblies have reached their front positions (FIG. 3). The mold pieces of the second and third blow molds 68 and 70 are closed on the longitudinally stretched portion of the tube 24 between the first or front point A and the front end of the first blow mold 40 at back point B. Then the first blow mold 40 is opened (FIG. 4), and the clamp jaws 31 of the stationary tube clamp assembly 26 are opened. This ends the first phase of the cycle of operation of the machine.

In the second phase of the cycle of operation of the machine the exit conveyor 80 is started and the second and third blow mold assemblies are pushed together in tandem by the piston rod 76 of the second prime mover from their front positions to their back positions (FIG. 5), while the first blow mold assembly 27 with the upper and lower mold pieces 41 and 42 thereof in open position and straddling the closed mold pieces of the second and third blow molds 68 and 70 is pulled by the piston rod 65 of the first prime mover to the front position of the first blow mold assembly. The travel of the second and third blow molds 68 and 70 from their front positions to their back positions pulls the tube 24 past the open clamp jaws 31 into the machine along the longitudinal axis of the machine. At the same time the previously formed part of the chain 21, which part comprises one bottle body 22, is pushed onto the moving conveyor 80. At a preselected point in the travel of the second and third blow mold assemblies from their front positions to their back positions, the clamp jaws 31 of the stationary tube clamp assembly close grippingly on the tube 24, stopping further travel of the tube into the machine, and causing the portion of the tube between the front point A at the clamp jaws 31 and the intermediate point C (FIG. 5) at the front end of the second blow mold 68 to become longitudinally stretched. This preselected point when the thermoplastic material of the tube 24 is polypropylene is about one-third of the full distance of travel of the second and third blow molds from their front positions to their back positions. The proportion of the distance of travel here, it will be observed, is substantilly the same as in the first phase of the cycle of operation of the machine. Consequently, when the second and third blow molds 68 and 70 reach their back positions, the portion of the tube between the first point A and the intermediate point C has been longitudinally stretched substantially to the same extent that the first blow mold 40 stretched the tube between the first point A and the back point B. After closure of the blow molds 68 and 70 of the second and third blow mold assemblies and by the time they have arrived at their back positions, the air blow pins 56 of these blow molds have been inserted into the stretched portions of the tube within the cavities, high pressure air has been blown through the pins 56 into said portion to expand them to conform substantially to the configurations of the cavities, and the thread forming and neck cramming mechanisms 55 have been actuated.

When the second and third blow mold assemblies 28 and 29 have reached their back positions, the discharge conveyor 80 is stopped. When the first blow mold assembly 27 has arrived at its front position (FIG. 5), the upper and lower mold pieces 41 and 42 of the first blow mold 40 are closed on the stretched portion of the tube between the front point A and the intermediate point C. The mold pieces of the third blow mold 70 are opened (FIG. 6), and the discharge conveyor 80 is started. Then the mold pieces of the second blow mold 68 are opened (FIG. 1). During the opening of the mold pieces of the second and third blow molds 68 and 70 and after closure of the mold process of the first blow mold 80, the clamp jaws 31 of the stationary tube clamp assembly are opened.

The cycle of operation of the machine 20 then is repeated.

Thus, this invention provides a three mold "hand-over-hand" blow molding machine and method having the advantage of a higher production rate compared to the two mold "hand-over-hand" blow mold machine and method of the prior art, and the feature of hollow article bodies, the material of each of which is biaxially oriented substantially to the same extent.

Other features, advantages and embodiments of the blow molding machine and method disclosed herein will be readily apparent to those exercising ordinary skill in the art after reading the foregoing disclosures. While specific embodiments of the machine and method have been described herein in considerable detail, variations and modifications of these embodiments can be effected without departing from the spirit and scope of the invention as described and claimed.

I claim:

1. A hand-over-hand blow molding machine for forming along a longitudinal axis a chain of hollow, shaped article bodies of a normally highly crystalline thermoplastic material which is biaxially oriented, from a continuous tube of said material in substantially unoriented condition, but at its orientation temperature, in which machine said tube in the first phase of the cycle of operation of said machine is pulled from a front point to a back point on said axis, and in the second phase of said operation is pulled from said front point to an intermediate point on said axis between said front and back points, said machine comprising (a) stationary tube clamp means to stop the travel of the tube past said front point during part of the time it is being pulled in each said phase, whereby in said first phase the portion of the tube between said front and back points becomes longitudinally stretched and in said second phase the portion of the tube between said front and intermediate points becomes longitudinally stretched;

(b) a first blow mold assembly on one side of said axis and comprising a first blow mold having a front end and a back end, and movable to and from a front position whereat its front end is in the region of the front point and a back position whereat its front end is substantially at said back point and the back end is at a back limit of mold travel, said mold having corresponding mold pieces closable on the stretched part of the tube between said front and intermediate points, and, after formation of a hollow body in the cavity defined by the closed mold pieces, operable to open positions whereat they are out of the path of travel of the closed mold pieces of the second and third blow molds hereinafter recited, tube inflation means for inflating the portion of the stretched part of the tube within the mold cavity, whereby one of said bodies is formed therein, and the material thereof becomes biaxially oriented, and mold opening and closing means for opening and closing said mold pieces to their open and closed positions;

(c) first prime mover means for moving longitudinally said first blow mold assembly and thus said first blow mold to and from its front and back positions;

(d) second and third blow mold assemblies on the other side of said axis and longitudinally connected together, said assemblies comprising adjacent, longitudinally aligned, second (front) and third (back) blow molds, said assemblies being movable longitudinally from and to front positions whereat the front end of the second mold is in the region of said front point, and back positions whereat the front end of the second mold is substantially at said intermediate point and the back end of the third mold is substantially at said back limit of mold travel, each of said molds having corresponding mold pieces closable on the stretched part of the tube between said first and third points and, after formation of the hollow body in each cavity defined by the closed mold pieces, openable to open positions whereat they are out of the path of travel of the closed mold pieces of the first blow mold, tube inflation means for inflating the portion of the stretched part of the tube within the mold cavity, whereby one of said bodies is formed therein, and the material thereof becomes biaxially oriented, and each of said second and third blow mold assemblies having mold opening and closing means for opening and closing the mold pieces of the blow molds thereof to their open and closed positions;

(e) second prime mover means for moving said second and third blow mold assemblies from and to their front and back positions; and (f) control means operable to cause
   (i) the mold opening and closing means of the first blow mold assembly to close the mold pieces of the first blow mold on the part of the tube between said front point and said intermediate point when the first blow mold is in its front position, and to maintain said mold pieces closed on said part of said tube while said first blow mold is being moved from its front position to its back position, and said tube is being pulled thereby to said back point, to open said mold pieces to their open position when said first blow mold is in its back position, and to maintain said mold pieces in said open positions while said blow mold is moved from its back position to its front position,
   (ii) said mold opening and closing means of the second and third blow mold assemblies to close the mold pieces of the second and third blow molds on the portion of the tube between said front point and said back point when the second and third blow molds are in their front positions, to maintain said mold pieces closed on said part of the tube while said blow molds thereof are moved from their front positions to their second positions, and said tube is being pulled thereby to said intermediate point, to open to their open position said mold pieces when said second and third blow molds are in their second positions, and to keep said mold pieces in said open position while the second and third blow mold assemblies are moved from their back positions to their front positions,
   (iii) the tube inflation means of the first blow mold to inflate the portion of the stretched part of the tube within the mold cavity of the first blow mold,
   (iv) the tube inflation means of the second and third blow molds to inflate the portion of the stretched part of the tube within each mold cavity of the second and third blow molds,
   (v) said first prime mover means to move said first blow mold assembly from its front position to its back position while said second and third blow mold assemblies are moved from their back positions to their front positions, and from their back positions to their front positions while said second and third blow mold assemblies are moved from their front positions to their back positions,
   (vi) said second prime mover means to move said second and third blow mold assemblies from their back positions to their front positions, and from their front positions to their back positions, and
   (vii) said stationary clamp means to close on said tube and stop its travel past the front point when the first blow mold assembly has moved a preselected proportion of the distance between the front and back positions thereof, whereby the portion of the tube between said front and back points becomes longitudinally stretched, to open after the mold pieces of said second and third molds have closed on said longitudinally stretched portion of the tube, to close on said tube and stop its travel past the front point when the second and third blow mold assemblies have moved said proportion of the distance between said front and back positions thereof, whereby the portion of the tube between said front and intermediate points becomes longitudinally stretched, and to open after the mold pieces of said first blow mold have closed on the latter portion of the tube, whereby said portions of the tube are longitudinally stretched substantially to the same extent.

* * * * *